June 13, 1967  W. HOGLUND  3,324,661
EXTERIOR FROST PROOF ACCESS TO WATER AND GAS ESCAPE DEVICE
Filed Sept. 2, 1964  2 Sheets-Sheet 1
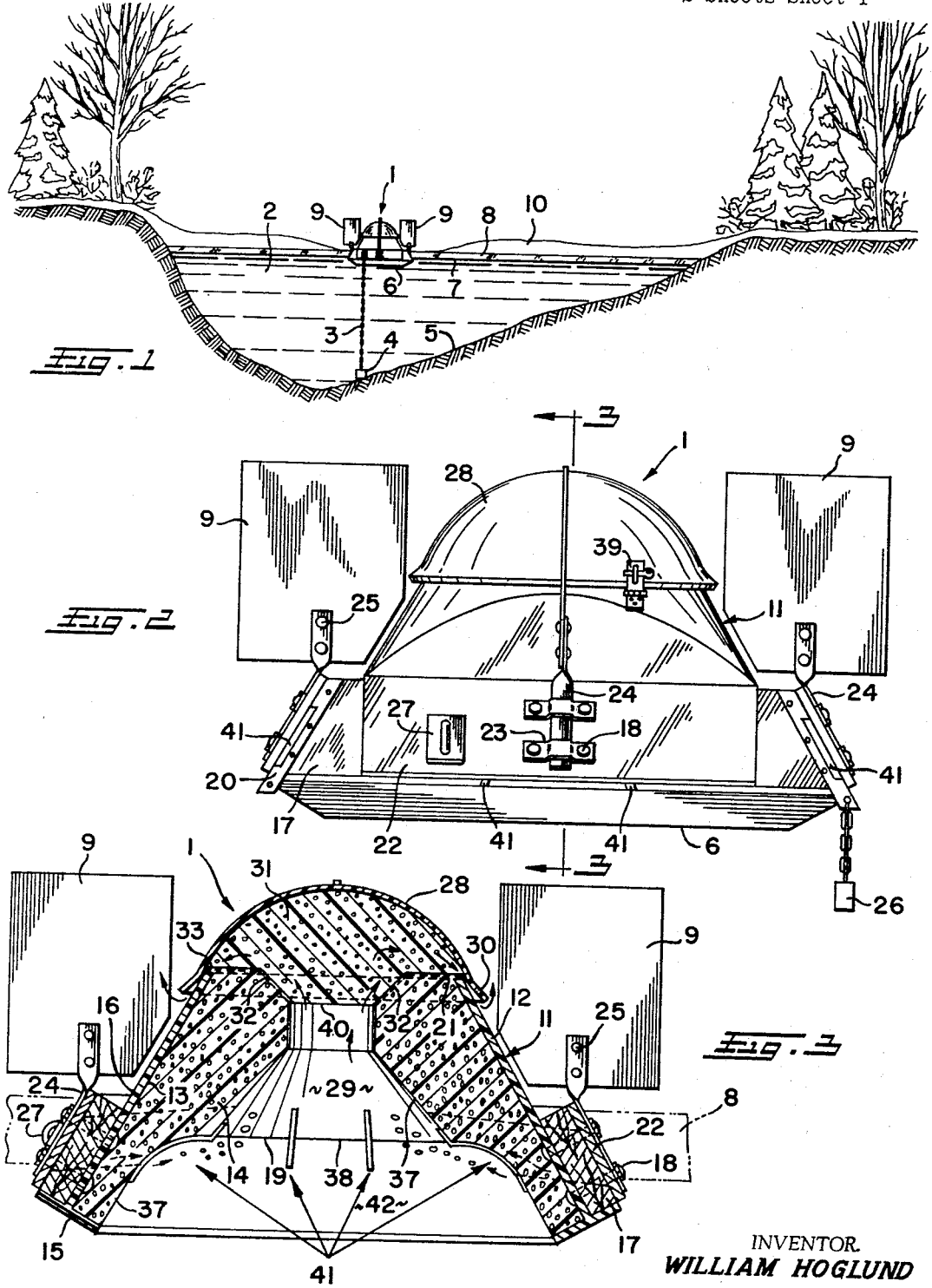
INVENTOR.
WILLIAM HOGLUND
BY
Oberlin, Maky & Donnelly
ATTORNEYS

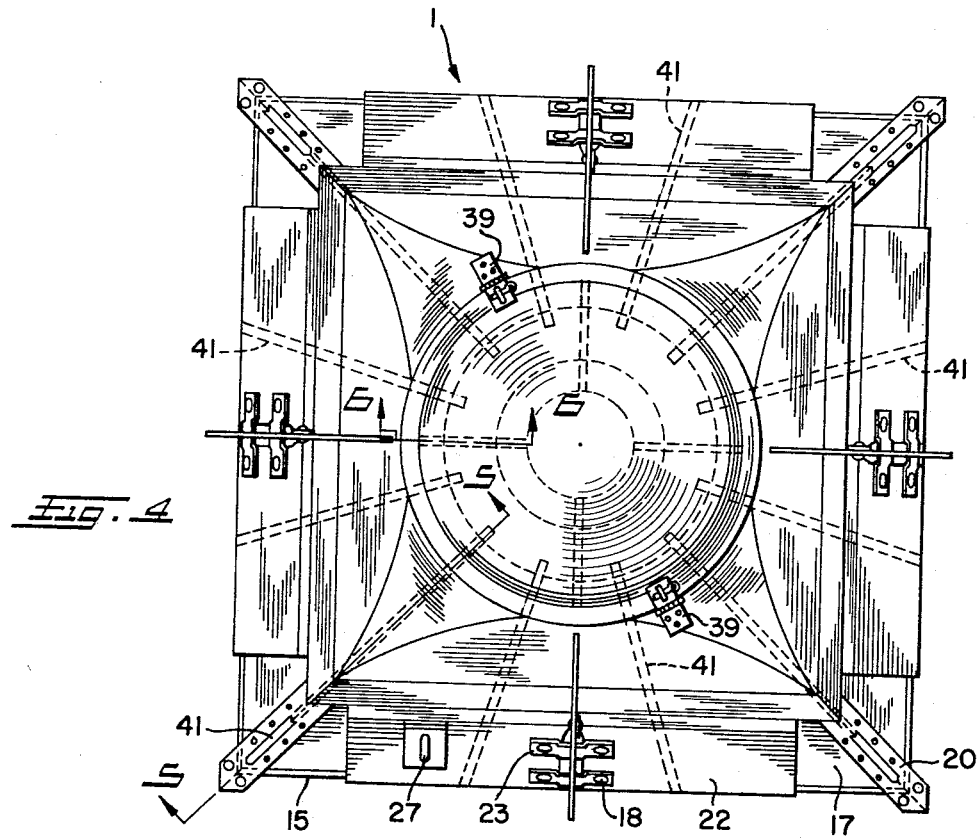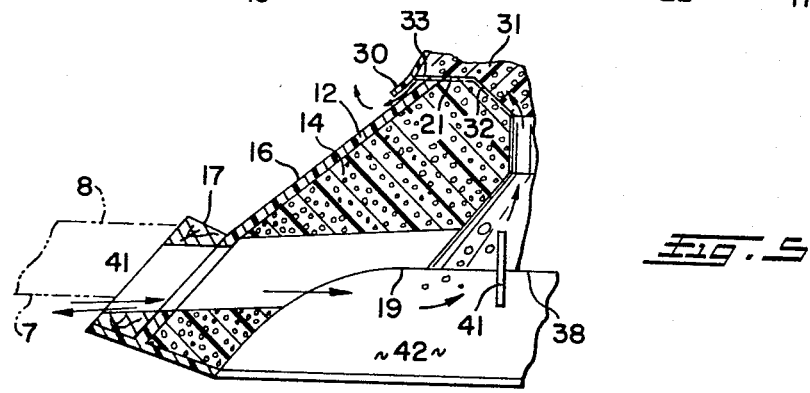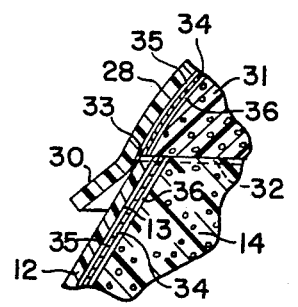

United States Patent Office 3,324,661
Patented June 13, 1967

3,324,661
EXTERIOR FROST PROOF ACCESS TO WATER
AND GAS ESCAPE DEVICE
William Hoglund, Mayfield Heights, Ohio, assignor of one-half to David Hoglund, Geneva, Ohio
Filed Sept. 2, 1964, Ser. No. 393,855
14 Claims. (Cl. 61—1)

This invention relates generally, as indicated, to an exterior frost proof access to water and gas escape device and, more particularly, to a protective device for preventing an area of a body of water, such as a pond or lake, from freezing.

During the winter months most bodies of water freeze over in many parts of the country. Should the layer of ice on a pond or lake become very thick and remain for a substantial period of time, swamp gases trapped under the ice cannot escape and the oxygen supply to the water is cut off, with the result that in most cases many, if not all, of the fish and other life in such ponds or lakes die. Moreover, the water is not accessible during such periods of freeze over for use by fire departments, civilian defense, construction work, scientific studies, recreation such as fishing, drinking water, or for depositing food for fish, etc.

It is therefore a principal object of this invention to provide a novel device for keeping a small area of the water surface of such ponds or lakes from freezing, thus allowing swamp gases trapped under the ice to escape and permitting the atmosphere to be in contact with the surface of the water. In general, the device consists of a hollow insulated enclosure whose lower edge is adapted to be submerged in a body of water below the normal expected under surface of ice when the latter forms and the upper edge extends above the water level to provide an air chamber within the enclosure. Air vents may be provided in the enclosure walls both below and above the ice layer to allow limited circulation of air between the interior of the enclosure and the outside air and permit the escape of swamp gases trapped under the ice.

It is another object of this invention to provide such a device for maintaining an easy access to the water through the ice, so that the water is available at all times during the winter for use in fighting fires, civilian defense, construction work, and as drinking water, to name a few.

It is another object to provide such a device which is adapted to float on the water surface with the lower edges thereof extending into the water below the normally expected thickness of the ice layer when the latter forms.

It is still a further object to provide such a protective device with deflectors to aid in keeping the surface of the ice adjacent such device free of snow.

Another object is to provide such a device with means to allow the escape of swamp gases trapped under the ice.

A further object is to provide such a device with upwardly converging walls to aid in preventing ice which forms adjacent thereto from lifting the device.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

In said annexed drawings:

FIG. 1 is a side elevation of a preferred embodiment of the novel fish pond protective device in accordance with the present invention floating on a farm fish pond or the like;

FIG. 2 is an enlarged side elevation of such protective device;

FIG. 3 is a sectional view taken on the plane of the line 3—3 of FIG. 2;

FIG. 4 is a top plan of the device as shown in FIG. 2;

FIG. 5 is an enlarged sectional view partially broken away taken on the plane of the line 5—5 of FIG. 4; and FIG. 6 is an enlarged sectional view partially broken away taken on the plane of the line 6—6 of FIG. 4.

Referring now more particularly to the drawing, there is illustrated in FIG. 1 a preferred example of the exterior frost proof access to water and gas escape device 1 floating on the surface of a pond 2 and anchored in place as by means of an anchor chain 3 having one end secured to the protective device 1 and the other end secured to an anchor 4 resting on the bottom 5 of the pond. It is preferable that the protective device 1 be floated to a desirable position on the surface of the pond and anchored in place before freezing, so as to avoid the necessity of having to cut a sufficiently large hole in the ice layer when the latter forms to allow the device to be floated on the surface of the water.

As can readily be seen, the lower edges 6 of the protective device 1 desirably extend below the lower surface 7 of the ice layer 8 which is formed on the surface of the pond. Secured to the outer surface of the protective device 1 there may be provided a plurality of deflectors 9 which are adapted to direct the wind to sweep the snow 10 off the ice 8 adjacent the protective device for a purpose which will be explained hereafter.

The exterior frost proof access to water and gas escape device 1 generally consists of an enclosure 11 constructed of rigid material, such as resin-impregnated fiber glass, having an open top and bottom and four side walls 12 which desirably slope upwardly in a convergent direction to aid in preventing the ice from lifting the device when the latter forms. The entire inner surface 13 of the enclosure walls 12 is covered with a suitable insulating material 14, such as polyurethane or polystyrene foam, to keep heat from escaping from the interior of the enclosure 11. As shown in FIGS. 3 and 5, the layer of insulation material 14 is preferably much thicker above the water surface 38 than below such water surface, thus forming a buoyancy shelf or flotation ledge 19 within the enclosure opening 29 at or near the water surface which insures a proper floating level for the device 1.

The lower ends of the walls 12 may be provided with a flange 15 extending beyond both the inner and outer surfaces 13 and 16 thereof. As can clearly be seen in FIGS. 3 and 4, the outer surface 16 of each wall 12 adjacent its lower end is shown as being substantially planer over its entire width and cooperates with the adjacent wall surfaces to form the enclosure 11 having a lower outer periphery of a substantially square configuration, thus permitting bulkheads 17 to be readily secured thereto by means of fasteners 18, such bulkheads 17 being adapted to rest on that portion of the flanges 15 extending beyond the outer surfaces 16 of the walls 12.

The bulkheads 17 may preferably be constructed of wood to give the device 1 rigid support against the pressure of the ice when the latter forms.

The walls 12 above that portion thereof to which the bulkheads 17 are secured are increasingly rounded symmetrically about their corners until such walls are substantially conical adjacent the top edge 21. However, it should be understood that the number of sides and particular configuration of the enclosure 11 may be varied as desired. For example, the enclosure may have a round base and conical walls.

Gas escape and corner support brackets 20 are secured to the corners of the bulkheads 17 by suitable fasteners, such brackets 20 extending downwardly below the bulkheads to form a support for weights 26 (see FIG. 2) suspended therefrom. As clearly shown in FIGS. 2 and 4, the brackets 20 are in the shape of angle irons.

The fasteners 18 also desirably securely hold steel weights 22 in position adjacent the outer surface of the bulkheads 17 as well as air deflector bracket holders 23 against the outer surface of the steel weights 22, such air against the outer surface of the steel weights 22, such air deflector bracket holders being adapted to hold air deflector brackets 24 in engagement with the steel weights.

It is preferred that a sufficient amount of such weights 22 and 26 be secured to the bulkheads 17 and brackets 20, respectively, so that when the protective device 1 is floated on the surface of a pond or the like the bottom edge 6 of the enclosure 11 will be caused to extend below the water level sufficiently far to be below the normally expected under surface of the ice layer when the latter forms, thus preventing such ice from forming directly below the protective device and tending to lift the latter.

Secured to the upper ends of the brackets 24 by means of rivets 25 are air deflectors 9. As previously stated, such air deflectors are adapted to direct the wind to sweep the snow off the ice adjacent the protective device. Maintaining the ice free of snow allows daylight to pass through the ice, which attracts the fish toward the device where there is an adequate supply of oxygen.

Rigidly secured to one of the steel weights 22, as by welding, for example, is an anchor chain support bracket 27, to which the end of the anchor chain 3 is adapted to be secured.

A removable dome-shape cover 28 is adapted to be placed over the opening 29 in the top of the enclosure 11 and firmly secured thereto by means of a cover locking device 39, the circumferential edge 30 of such cover being preferably slightly flared so as to overlap the upper ends of the walls 12. The cover 28 is also preferably made of resin-impregnated fiber glass and has a polyurethane foam lining 31, the outer surface of which is shaped to conform to the upper surface of the insulation 14 on the walls 12, thus substantially closing the top of the opening 29 to the outside air.

Small air vent grooves 32 are provided in the insulation lining 31 of the cover 28 adjacent the top edge 21 of the enclosure 11 and the upper surface of the insulation 14, such grooves extending from the opening 29 to the joint 33 formed between the top edge of the walls 12 and the overlapping edge 30 of the cover 28 to allow limited circulation of air between the interior of the enclosure 11 and the outside air. These grooves 32 must be sufficiently large to provide the desired amount of oxygen within the interior of the enclosure, but sufficiently small not to admit sufficient cold air unduly to chill such interior.

Ice is precluded from forming in the interior of the enclosure 11 since the cold outside air is prevented from entering the same by the insulated fiber glass walls 12 and cover 28, and the heat retained by the large body of water is sufficient to prevent freezing within the particular limited area enclosed by the protective device.

The heat loss from within the interior of the protective device 1 may be further reduced by providing the inner surface 13 of the walls 12 and cover 28 with a reflective coating to reflect the heat attempting to escape back into the interior thereof. Thus, as seen in FIG. 6, the inner surface 13 of the walls 12 of the enclosure and the inner surface of the cover 28 are shown provided with an inner reflective coating 34 bonded thereto by a suitable adhesive 35 with the polyurethane foam insulation 14 secured to the inner surface of the reflective coating by means of a similar adhesive 36. Aluminum foil, for example, may be used as the reflective coating 34, with the bright side of the foil facing the centrum of the enclosure.

Moreover, if desired, such a reflective coating may also be bonded to the inner surface 37 of the insulation 14 and to the inner surface 40 of the insulation lining 31 by a suitable adhesive to still further reduce the heat loss from the interior of the device 1.

Further, the entire outer surface of the protective device 1 may be coated black to increase the amount of heat absorbed by the enclosure from the sun.

Gas escape and water circulating slots 41 are provided through the lower corners as well as through the lower edges of bulkheads 17 well below the expected ice formation, such slots 41 entering from the outer surfaces of the bulkheads 17 and extending through the insulation layer 14 to create a path for fluid communication between the exterior of the enclosure and the interior thereof. The slots 41 extend at a rising angle toward the interior of the device to aid in the escape of gases therethrough trapped under the ice into such interior, from which the gases pass through the vent slots 32 and out into the atmosphere.

Also, the angle of such slots 41 will produce a thermal circulating movement of warm water 42 from the interior of the device 1 toward its perimeter through the slots and thus out into the pond or lake. Thus, when the water in the slots 41 begins to freeze at their outside edges, this thermal gravitational downward movement of the warmer aerated water from the interior of the device through the slots 41 will to a substantial degree keep such slots open and free of ice.

Not only is the device 1 relatively inexpensive and simple in construction, but it will operate throughout the entire winter without requiring any maintenance whatsoever.

While the number and size of such protective devices necessary to provide an adequate supply of oxygen to a pond to preserve the life of the fish therein will vary depending on the thickness of the ice layer, the size of the pond, the number and kinds of fish therein, the amount of vegetation on the bottom surface of the pond, etc., it has been found that one such device approximately 4' square at its lower peripheral edge was adequate for a quarter-acre pond.

It can now be seen that the above-disclosed exterior frost proof access to water and gas escape device provides a relatively simple means for keeping a small area of the water surface of ponds or lakes from freezing. Not only does such a device allow swamp gases to escape from under the ice and maintain an easy access to the water through the ice, but such device may be floated or otherwise disposed above the inlet end of a dam spillway pipe and the like to preclude the water therein from freezing and prevent floating ice from entering and clogging the pipe, thus allowing the pipe to control the water level even during the winter when the water is frozen over.

Other modes of applying the principles of the invention may be employed, change being made as regards the details described, provided the features stated in any of the following claims or the equivalent of such be employed.

I therefore, particularly point out and distinctly claim as my invention:

1. A device for preventing ice from forming on a small surface area of a body of water and providing an air chamber adjacent thereto comprising an insulation-lined box-like enclosure means having side walls and a closed top and open bottom, said side walls having a lower peripheral edge, flotation ledge means disposed within said enclosure means for maintaining said device afloat on the surface of such body of water, weights secured to said enclosure means, said weights being of sufficient weight to cause said peripheral edge to extend downward below the water level a sufficient distance to be below the normal expected layer of ice when the latter forms, said side walls being of sufficient length that, when said lower peripheral edge is so disposed, the upper portion of said enclosure means extends above such water surface to provide an air chamber thereabove, and air vents in said enclosure means for allowing limited air circulation between said chamber and the outside air, said vents being sufficiently small not to admit sufficient cold air unduly to chill said air chamber.

2. The device of claim 1, wherein said side walls slope upwardly in a convergent direction.

3. The device of claim 1, wherein said insulation is made of polyurethane foam and said enclosure means is made of resin-impregnated fiber glass.

4. The device of claim 1, further including deflectors mounted on the outer surface of said enclosure means, said deflectors being adapted to direct the wind to sweep any snow which would normally accumulate adjacent said device away therefrom.

5. The device of claim 1, wherein said closed top is in the form of a removable cover to permit access to the interior of said device.

6. The device of claim 1, wherein the entire outside surface thereof is coated black and the inside surface is provided with a reflective coating disposed between said enclosure means and said insulation.

7. The device of claim 6, wherein the inside surface of said insulation is also provided with a reflective coating.

8. The device of claim 1, wherein said enclosure means is provided with gas escape slots adjacent the lower edge thereof, said slots extending from the outer surface of said enclosure means through said insulation so as to be in fluid communication with the air chamber of said enclosure means, said slots being adapted to allow swamp gases trapped underneath the ice to escape into said air chamber and thus to the atmosphere.

9. The device of claim 8, wherein said gas escape slots extend at a rising angle toward the interior of said enclosure means to aid in the escape of said swamp gases and to produce a thermal circulation of water from the interior of said enclosure means through said slots to such body of water.

10. A fish pond protective device comprising an insulated box opening downwardly to afford a lower peripheral edge portion adapted to extend downwardly not only below the unfrozen surface of a pond but also substantially below the full depth of an ice layer on such pond with a substantially closed but slightly vented air chamber above the unfrozen water surface enclosed within the confines of said box, such insulation extending toward said lower peripheral edge to a level at least the full depth of such ice layer, and at least one narrow gas escape slot leading from near said lower peripheral edge through the side wall of said box to provide for escape of gas trapped beneath such ice to the interior of said chamber.

11. A fish pond protective device comprising an insulated box opening downwardly to afford a lower peripheral edge portion adapted to extend downwardly not only below the unfrozen surface of a pond but also substantially below the full depth of an ice layer on such pond with a substantially closed but slightly vented air chamber above the unfrozen water surface enclosed within the confines of said box, such insulation extending toward said lower peripheral edge to a level at least the full depth of such ice layer, a plurality of narrow gas escape and water circulating slots leading from near said lower peripheral edge through the side wall of said box to provide for escape of swamp gases trapped beneath the ice to the interior of said chamber and to allow thermal circulation of warm water from the interior of said chamber through said slots, said insulation extending substantially below such ice layer to maintain the functions of said gas escape and water circulating slots.

12. An exterior frost proof access to water and gas escape device comprising a hollow enclosure means having side walls and an open top and bottom, said side walls having a lower edge, a removable cover closing said open top, and insulation completely covering the inner surfaces of said side walls and cover for retaining heat within said hollow enclosure means, means for maintaining said lower edge below the surface of a body of water a sufficient distance to be below the normal expected under surface of the ice layer when the latter forms, said side walls being of sufficient length to extend far enough above the water surface to provide an air chamber within said enclosure means above such water surface when said lower edge is thus maintained, and a limited number of relatively small air passage means in said device for positively venting the interior of said enclosure means with the outside air at all times while keeping the heat loss through said passage means to a minimum to avoid undue chilling of said chamber.

13. A device for preventing ice from forming on a small surface area of a pond and the like comprising an insulated box opening downwardly to afford a lower peripheral edge portion adapted to extend downwardly not only below the unfrozen surface of a pond but also substantially below the full depth of an ice layer on such pond with a substantially air-tight chamber above the unfrozen water surface enclosed within the confines of said box, such insulation covering the inner surface of said box and extending toward said lower peripheral edge to a level at least the full depth of such ice layer, and a plurality of small air passage means in said box providing limited air circulation between said chamber and the outside air without unduly chilling said chamber.

14. A device for maintaining a small area of the surface of a pond free from ice comprising a hollow insulated enclosure having an enclosed top and side walls and an open bottom, said side walls having a lower peripheral edge, means secured to said enclosure for maintaining portions of said side walls above and below the surface of such pond with said lower peripheral edge extending below the normally expected ice layer when the latter forms on the surface of such pond, and insulation completely covering the inner surface of said enclosed top and side walls to retain sufficient heat within the interior of said enclosure to prevent freezing of the water within said device, said insulation being of a buoyant material which is substantially thicker inside and above the lower peripheral edge of said side walls to provide a buoyancy shelf for said device.

References Cited

UNITED STATES PATENTS

| | | | |
|---|---|---|---|
| 2,562,922 | 8/1951 | Kist | 9—8 |
| 2,814,055 | 11/1957 | Phillips | 9—8 |
| 2,827,268 | 3/1958 | Staaf. | |
| 2,838,196 | 6/1958 | Chapman. | |
| 2,914,926 | 12/1959 | Meagher | 43—4 X |
| 3,077,614 | 2/1963 | Lloyd | 9—8 |
| 3,148,509 | 9/1964 | Laurie | 61—1 X |
| 3,170,299 | 2/1965 | Clarke | 61—1 |
| 3,177,465 | 4/1965 | Wyatt | 9—8 X |

EARL J. WITMER, *Primary Examiner.*